United States Patent [19]

Meister et al.

[11] Patent Number: 5,221,284
[45] Date of Patent: Jun. 22, 1993

[54] METHOD OF COATING LEATHER USING AQUEOUS SYNTHETIC RESIN DISPERSIONS

[75] Inventors: Martin Meister, Speyer; Guenter Eckert, Limburgerhof; Juergen Schmidt-Thuemmes, Neuhofen; Albrecht Zosel, Weinheim, all of Fed. Rep. of Germany

[73] Assignee: BASF Aktiengesellschaft, Ludwigshafen, Fed. Rep. of Germany

[21] Appl. No.: 718,421

[22] Filed: Jun. 20, 1991

Related U.S. Application Data

[62] Division of Ser. No. 473,411, Feb. 1, 1990, abandoned.

Foreign Application Priority Data

Feb. 18, 1989 [DE] Fed. Rep. of Germany ... P3905010.6

[51] Int. Cl.$^5$ .................. D06M 19/00; B32B 27/32
[52] U.S. Cl. .................. 8/94.1 R; 428/521; 428/522; 428/523; 428/540; 523/201; 524/822; 524/823; 524/824
[58] Field of Search .................. 428/540, 521-523; 8/94.1 R

References Cited

U.S. PATENT DOCUMENTS 4,581,034 4/1986 Eckert et al. .................. 428/540

FOREIGN PATENT DOCUMENTS 0039896 11/1981 European Pat. Off. .
0058366 8/1982 European Pat. Off. .
0201099 11/1986 European Pat. Off. .

OTHER PUBLICATIONS

Chemical Abstracts, Band 86, 1977, Seite 17, Zusammenfassung Nr. 156214j, Columbus, Ohio, US; & DD-A-114 956 (F. Steffers et al.) Sep. 5, 1975.

Primary Examiner—John C. Bleutge
Assistant Examiner—Mark Sweet
Attorney, Agent, or Firm—Oblon, Spivak, McClelland, Maier & Neustadt

[57] ABSTRACT

Aqueous synthetic resin dispersions are obtainable by copolymerizing

A) from 70 to 97.5 parts by weight of a monomer mixture containing
  a) from 40 to 75% by weight of butadiene (monomer I),
  b) from 25 to 60% by weight of acrylonitrile (monomer II),
  c) from 0 to 25% by weight of styrene (monomer III),
  d) from 0 to 10% by weight of one or more amides of $\alpha,\beta$-monoethylenically unsaturated monocarboxylic acids of 3 to 5 carbon atoms (monomers IV) and
  e) from 0 to 10% by weight of other copolymerizable monomers (monomers V) and B) from 2.5 to 30 parts by weight of one or more copolymerizable monovinyl compounds (monomers VI) in aqueous emulsion at from 30° to 70° C. by a method in which not less than 50% by weight of the monomer mixture A is prepolymerized to a conversion of not less than 80%, and the polymerization is then continued with the addition of the remaining monomers A and the monomers B.

These dispersions are suitable as binders for protective coats on leather.

2 Claims, No Drawings

METHOD OF COATING LEATHER USING AQUEOUS SYNTHETIC RESIN DISPERSIONS

This is a division, of application Ser. No. 07/473,411, filed on Feb. 1, 1990 now abandoned.

The present invention relates to aqueous synthetic resin dispersions, obtainable by copolymerizing A) from 70 to 97.5 parts by weight of a monomer mixture containing
  a) from 40 to 75% by weight of butadiene (monomer I),
  b) from 25 to 60% by weight of acrylonitrile (monomer II),
  c) from 0 to 25% by weight of styrene (monomer III),
  d) from 0 to 10% by weight of one or more amides of $\alpha,\beta$-monoethylenically unsaturated monocarboxylic acids of 3 to 5 carbon atoms (monomers IV) and
  e) from 0 to 10% by weight of other copolymerizable monomers (monomers V) and
B) from 2.5 to 30 parts by weight of one or more copolymerizable monovinyl compounds (monomers VI) at from 30° to 70° C. in aqueous emulsion so that not less than 50% by weight of the monomer mixture A is prepolymerized to a conversion of not less than 80%, and then continuing the polymerization with the addition of the remaining monomers A and the monomers B.

The present invention furthermore relates to a process for the preparation of these dispersions and the use of these dispersions as binders for protective coats on leather.

EP-B 29170 discloses carboxylated synthetic rubber dispersions which, after the addition of oxides and/or hydroxides of divalent metals, are recommended as binders for protective coats on leather, in order to impart to these protective coats both good dry flexing resistance and good wet flexing resistance. However, the performance characteristics of these binders were not completely satisfactory with respect to the wet flexing resistance of the resulting leather protective coats. Moreover, they do not have completely satisfactory low temperature breaking strength.

It is an object of the present invention to overcome the disadvantages described by means of synthetic resin dispersions which are particularly suitable as binders for protective coats on leather.

We have found that this object is achieved by the synthetic resin dispersions as defined at the outset.

The amides of acrylic acid or methacrylic acid are advantageously copolymerized as monomers IV, and particularly suitable monomers V are the acrylates and methacrylates of $C_1$-$C_8$-alkanols, methacrylonitrile, N-alkyl derivatives of acrylamide and methacrylamide, which derivatives carry lower alkyl groups, and vinylaromatic compounds, such as styrene. Preferred esters of acrylic acid and of methacrylic acid are methyl acrylate, methyl methacrylate, n-butyl acrylate, n-butyl methacrylate and 2-ethylhexyl acrylate, while N-methylmethacrylamide is a preferred copolymer from among the said N-alkyl derivatives. Particularly suitable monomer mixtures A have the following composition:
from 40 to 65% by weight of butadiene,
from 25 to 35% by weight of acrylonitrile,
from 5 to 50% by weight of styrene,
from 2 to 7% by weight of acrylamide and/or methacrylamide and
from 0 to 10% by weight of monomers V.

Particularly suitable monomers VI are acrylic acid, methacrylic acid and the monomers V. Styrene and methyl methacrylate are particularly advantageously copolymerized as monomers VI. Advantageously, from 3 to 22% by weight, based on the monomers A, of monomers B are incorporated.

The novel synthetic resin dispersions are advantageously prepared in a pressure vessel by polymerization of the particular monomers in an aqueous medium under the known conditions of emulsion polymerization in the presence of water-soluble free radical initiators and emulsifiers and in the presence or absence of regulators, buffer substances and further assistants, by prepolymerizing not less than 50% by weight of monomer mixture A to a conversion of not less than 80% and then continuing the polymerization with the addition of the remaining monomers A and the monomers B. The polymerization temperature is from 30° to 70° C., preferably from 45° to 65° C.

The prepolymerization, which in accordance with the definition may include the total amount of the monomers A, may be carried out either as a batchwise process or as a feed process. The feed process in which an initially taken part of the polymerization mixture is heated to the polymerization temperature and the remainder is then fed in continuously while maintaining the polymerization temperature is preferred. In this procedure, the monomers A can be introduced in pure or emulsified form or as an aqueous solution. The monomers A are preferably fed in as an aqueous emulsion. The initially taken material may be only water or may include other substances taking part in the polymerization, such as monomers A, initiators or emulsifiers. The initially taken material particularly advantageously contains from 25 to 35% by weight of the amount of water used for the total emulsion polymerization, from 5 to 10% by weight of the total amount of monomers A, the total amount of initiators and a proportion of the total amount of emulsifiers which corresponds to the initially taken amount of monomers A.

As a batchwise process, the prepolymerization takes, as a rule, from 2 to 10 hours, depending on the amount of monomers A used. In the feed process, the continuous feed of the polymers A to be prepolymerized usually takes the same time.

Continued polymerization with the addition of the remaining monomers A and the monomers B is carried out immediately after the prepolymerization, and once again the monomers may be added in pure or emulsified form or as an aqueous solution, all at once or continuously. The remaining monomers A and the monomers B may be added either at separate points or via a common feed vessel and in any order. While the feed rate of monomers B is of minor importance, the feed of the remaining monomers A should not be slower than in the case of prepolymerization by the feed process. In a preferred embodiment, the feed of monomers B begins when 80% of the total amount of monomers A have already been fed into the initially taken mixture during prepolymerization by the feed process, the addition of the monomers B being carried out synchronously with the continuous addition of the remaining monomers A. After the end of the monomer feed, polymerization is advantageously continued for a few hours.

Examples of suitable water-soluble polymerization initiators are inorganic peroxo compounds, such as hydrogen peroxide, sodium peroxydisulfate, potassium peroxydisulfate or ammonium peroxydisulfate, and organic peroxides or hydroperoxides, such as tert-butyl hydroperoxide or tert-butyl perbenzoate. The amount of initiator used is from 0.05 to 0.6% by weight, based on the total amount of monomers used. The organic peroxo compounds are preferably employed in combination with suitable reducing agents. Examples of such reducing agents are sulfur dioxide, thiosulfate, dithionite, hydrazine sulfate, glucose, ascorbic acid and sodium hydroxymethanesulfinate.

Emulsifiers which have proven particularly useful are alkali metal salts of higher fatty alcohol sulfates, such as Na n-laurylsulfate, ethoxylated alkylphenols (degree of ethoxylation from 3 to 30, $C_8$–$C_{10}$-alkyl radical) and ethoxylated fatty alcohols (degree of ethoxylation from 5 to 50, $C_8$–$C_{25}$-alkyl radical). Emulsifier mixtures are preferably used. In some cases, the addition of buffer substances, such as tetrasodium diphosphate, proves advantageous for bringing the pH of the polymerization medium to 2-10. The emulsion polymerization is preferably carried out at a pH of from 4 to 9. Chain transfer agents, such as tetrabromomethane, tetrabromoethane or higher alkyl mercaptans, such as tert-dodecyl mercaptan, may also be used in the polymerization. They are particularly advantageously added when the emulsion polymerization is carried out at fairly high temperatures. The solids content of the novel dispersions is of minor importance. It is advantageously from 30 to 60% by weight. The novel aqueous synthetic resin dispersions even alone are more suitable as binders for the production of protective coats having high low temperature breaking strength and good dry and wet flexing resistance than the carboxylated synthetic rubber dispersions of EP-B 29170 after the addition of oxides and/or hydroxides of divalent metals. They can be used on both full-grained or buffed leather and on split leather fiber materials. They are usually used with a solids content of from 15 to 40% by weight.

To meet fashion requirements, colored leather protective coats are generally applied. For this purpose, aqueous pigment formulations, which usually contain, as essential components, water, finely divided inorganic or organic pigments (e.g. iron oxide, titanium dioxide, azo pigments, phthalocyanines or carbon black), dispersants or, if required, thickeners, such as casein, thermoplastic or nonthermoplastic binders and further assistants, such as preservatives, are generally stirred into the synthetic resin dispersions serving as binders.

The colored leather protective formulations thus obtainable are applied to the leather by curtain coating, knife coating, spreading, spraying or brushing or by the plush process. In general, a base protective coat is first applied, ironing is carried out and a top coat of the same composition is then applied. After drying of the top coat is complete, nitrocellulose or other cellulose esters are among the suitable binder-containing seasons for imparting the desired gloss or physical fastness properties to the protective coat.

EXAMPLES

Example 1

Preparation of various synthetic resin dispersions B1 to B8

B1

A mixture of 12 g of sodium peroxydisulfate, 1.6 kg of water and 9.1% of feed 1 was initially taken in a pressure vessel and heated to the polymerization temperature of 55° C. in the course of 30 minutes. Thereafter, the remaining amount of feed 1 was introduced in the course of 6 hours via a feed vessel 1 while maintaining the polymerization temperature, the said feed 1 being supplemented during the final two hours by feed 2 introduced via a feed vessel 2. After the end of the monomer feed, polymerization was continued for a further 8.5 hours. The solids content of the resulting dispersion was 38.6% by weight.

Feed 1:
3.4 kg of water,
2.2 kg of butadiene,
1.0 kg of acrylonitrile,
200 g of methacrylamide,
500 g of 15% strength by weight aqueous solution of Na n-laurylsulfate (emulsifier I),
140 g of a mixture of ethoxylated linear $C_{16}$–$C_{18}$-alkanols (degree of ethoxylation 50, emulsifier II),
12 g of tetrasodium disphosphate and
32 g of tert-dodecyl mercaptan Feed 2:
269 g of water,
403 g of styrene,
201 g of methacrylic acid and
27 g of emulsifier I

B2

A mixture of 12.6 g of sodium peroxydisulfate, 1.68 kg of water and 9% of feed 1 was initially taken in a pressure vessel and heated to the polymerization temperature of 55° C. in the course of 30 minutes. Thereafter, the remaining amount of feed 1 was introduced in the course of 6 hours while maintaining the polymerization temperature. After the end of the introduction of feed 1, feed 2 was introduced in the course of 30 minutes. Polymerization was then continued for a further 8.5 hours. The resulting dispersion had a solids content of 34.2% by weight.

Feed 1:
3.1 kg of water,
2.3 kg of butadiene,
1.0 kg of acrylonitrile,
200 g of styrene,
200 g of methacrylamide,
530 g of emulsifier I,
420 g of a 20% strength by weight aqueous solution of ethoxylated isooctylphenol (degree of ethoxylation 25, emulsifier III),
12.6 g of tetrasodium disphosphate and
33.5 g of tert-dodecyl mercaptan Feed 2:
210 g of styrene and
210 g of methacrylic acid

B3

A mixture of 12 g of sodium peroxydisulfate, 1.6 kg of water and 5.8% of feed 1 was initially taken in a pressure vessel and heated to the polymerization temperature of 55° C. in the course of 30 minutes. Thereafter, the remaining amount of feed 1 was introduced in the course of 3 hours via a feed vessel 1 while maintaining the polymerization temperature, the said feed 1 being supplemented during the final hour by feed 2 introduced via a feed vessel 2. After the end of the monomer feed, polymerization was continued for a further 8.5 hours. The resulting dispersion had a solids content of 38.7% by weight.

Feed 1:
3.4 kg of water,
2.2 kg of butadiene,
1.4 kg of acrylonitrile,
200 g of styrene,
200 g of methacrylamide,
540 g of emulsifier I,
140 g of emulsifier II,
12 g of tetrasodium disphosphate and
32 g of tert-dodecyl mercaptan
Feed 2:
269 g of water and
201 g of methacrylic acid

B4

A mixture of 11.9 g of sodium peroxydisulfate, 1.59 kg of water and 8.9% of feed 1 was initially taken in a pressure vessel and heated to the polymerization temperature of 65° C. in the course of 30 minutes. Thereafter, the remaining amount of feed 1 was introduced in the course of 6 hours via a feed vessel 1 while maintaining the polymerization temperature, the said feed 1 being supplemented during the final 30 minutes by the feed 2 introduced via a feed vessel 2. Before the beginning of feed 2, a solution of 1.8 g of sodium peroxydisulfate in 176 g of water was added all at once to the reaction mixture. After the end of the monomer feed, polymerization was continued for a further 6 hours. A dispersion having a solids content of 39.4% by weight was obtained.

Feed 1:
3.3 kg of water,
2.2 kg of butadiene,
1.0 kg of acrylonitrile,
200 g of styrene,
200 g of methacrylamide,
480 g of emulsifier I,
140 g of emulsifier II,
12 g of tetrasodium disphosphate and
40 g of dodecyl mercaptan
Feed 2:
264 g of water,
198 g of methacrylic acid,
198 g of methyl methacrylate and
26.4 g of emulsifier I

B5

A mixture of 12.1 g of sodium peroxydisulfate, 1.59 kg of water and 8.7% of feed 1 was initially taken in a pressure vessel and heated to the polymerization temperature of 55° C. in the course of 30 minutes. Thereafter, the remaining amount of feed 1 was introduced in the course of 6 hours while maintaining the polymerization temperature, followed by the addition of 202 g of styrene as feed 2 in the course of 30 minutes. After the end of the monomer addition, polymerization was continued for a further 8.5 hours.

Feed 1:
3.4 kg of water,
2.2 kg of butadiene,
1.0 kg of acrylonitrile,
200 g of styrene,
200 g of methacrylamide,
500 g of emulsifier I,
400 g of emulsifier III,
12 g of tetrasodium disphosphate and
32 g of tert-dodecyl mercaptan

B6

A mixture of 10.6 g of sodium peroxydisulfate, 1.6 kg of water and 9.4% of feed 1 was initially taken in a pressure vessel and heated to the polymerization temperature of 55° C. in the course of 30 minutes. Thereafter, the remaining amount of feed 1 was added in the course of 6 hours via a feed vessel 1 while maintaining the polymerization temperature, the said feed 1 being supplemented during the final 30 minutes by feeds 2 and 3 introduced via a feed vessels 2 and 3. After the end of the monomer addition, polymerization was continued for a further 7.5 hours. The solids content of the resulting dispersion was 40.1% by weight.

Feed 1:
2.9 kg of water,
2.3 kg of butadiene,
1.0 kg of acrylonitrile,
200 g of styrene,
200 g of methacrylamide,
520 g emulsifier I,
310 g of a 20% strength by weight aqueous solution of a mixture of ethoxylated linear $C_{12}$- or $C_{14}$-alkanols (degree of ethoxylation 20, emulsifier IV),
12 g of tetrasodium disphosphate and
33.3 g of tert-dodecyl mercaptan
Feed 2:
269 g of water,
208 g of methacrylic acid
208 g of methyl methacrylate and
26 g of emulsifier I
Feed 3:
A solution of 1.85 g of sodium peroxydisulfate in 109 g of water.

B7

A mixture of 10.32 g of sodium peroxydisulfate, 1.62 kg of water and 9.1% of feed 1 was initially taken in a pressure vessel and heated to the polymerization temperature of 55° C. in the course of 30 minutes. Thereafter, the remaining amount of feed 1 was introduced in the course of 5.5 hours while maintaining the polymerization temperature. After the end of the addition of feed 1, feed 2 was introduced in the course of 30 minutes. Before the beginning of feed 2, a solution of 1.8 g of sodium peroxydisulfate in 180 g of water was added all at once to the reaction mixture. After the end of the monomer addition, polymerization was continued for a further 6 hours. The resulting dispersion had a solids content of 37.9% by weight.

Feed 1:
3.2 kg of water,
2.2 kg of butadiene,
1.0 kg of acrylonitrile,
200 g of styrene,
200 g of methacrylamide,
480 g of emulsifier I,
140 g of emulsifier II,
12 g of tetrasodium disphosphate and
32 g of dodecyl mercaptan
Feed 2:
269 g of water,
202 g of methacrylic acid
202 g of styrene and
227 g of emulsifier I

B8

A mixture of 12 g of sodium peroxydisulfate, 1.6 kg of water and 8.9% of feed 1 was initially taken in a pressure vessel and heated to the polymerization temperature of 55° C. in the course of 30 minutes. Thereafter, 5/6 of the remaining amount of feed 1 were introduced in the course of 5 hours via a feed vessel 1 while maintaining the polymerization temperature. Feed 2 was then mixed with the 1/6 of feed 1 remaining in feed vessel 1, and the mixture obtained was fed into the reaction mixture in the course of 1 hour. After the end of the monomer addition, polymerization was continued for a further 8.5 hours. The solids content of the resulting dispersion was 39.2% by weight.

Example 2

Testing of various leather protective coats 100 g of an aqueous pigment formulation which contained, as essential components, 12% by weight of finely divided carbon black, 85% by weight of water and 2.5% by weight of a dispersant were stirred into 400 g of each of the dispersions B1 to B3 and B7 and B8, whose solids content had been brought to 30% by weight beforehand by dilution with water. 20 g/m² of the formulations obtained were applied to buffed box leather with the aid of a mold board covered with absorptive plush and hot-pressed at 90° C. Thereafter, a further 4 g/m² of the same formulations were applied using the plush pad, and the residual amount then still required for complete coverage was applied by spraying. Thereafter, drying was carried out at 80° C. in the air and a season containing nitrocellulose as a binder was applied. The low temperature breaking strength, the dry flexing resistance (50,000 flexes with a Bally flexometer) and the wet flexing resistance (20,000 flexes with a Bally flexometer) were then determined for the leather protective coats produced in this manner, by the methods of the International Union of Leather Chemists Associations (I.U.P. Methods). The results are shown in Table 1. Table 1 also contains the result of a Comparative Experiment V1, in which a mixture containing 5 parts of latex A and 1 part of ZnO-containing paste A according to EP-B 29170 was used instead of a novel dispersion.

TABLE 1

| | Dispersions used | | | | | |
|---|---|---|---|---|---|---|
| | B1 | B2 | B3 | B7 | B8 | V1 |
| Low temperature breaking strength | Very good | Very good | Very good | Good | Very good | Satisfactory |
| Dry flexing resistance | Very good | Very good | Good | Very good | Very good | Very good |
| Wet flexing | Very | Very | Good | Very | Very | Poor |

TABLE 1-continued

| | Dispersions used | | | | | |
|---|---|---|---|---|---|---|
| | B1 | B2 | B3 | B7 | B8 | V1 |
| resistance | good | good | | good | good | |

We claim:

1. A method for coating leather comprising treatment of leather with a composition comprising as a binder an aqueous synthetic dispersion obtained by copolymerizing (A) from 70 to 97.5 parts by weight of a monomer mixture comprising
  a) from 40 to 75% by weight of butadiene (monomer I),
  b) from 25 to 60% by weight of acrylonitrile (monomer II),
  c) from 0 to 25% by weight of styrene (monomer III); and
  d) from 0 to 10% by weight of one or more amides of α, β-monoethylenically unsaturated monocarboxylic acids of 3 to 5 carbon atoms (monomers IV), and B) from 2.5 to 30 parts by weight of one or more copolymerizable monovinyl compounds (monomers VI) selected from the group consisting of acrylic acid, methacrylic acid, an acrylate or methacrylate of $C_{1-8}$ alkanol, methacrylonitrile, an N-(lower)alkyl acrylamide or methacrylamide, a vinyl aromatic compound and a mixture thereof;

at from 30° to 70° C. in aqueous emulsion so that not less than 50% by weight of the monomer mixture A is prepolymerized to a conversion of not less than 80%, and then continuing the polymerization with the addition of the remaining monomers A and the monomers B, wherein the feed of monomers B begins when 80% of the total amount of monomers A have already been fed into the initially taken mixture during prepolymerization of the feed process.

2. The method of clam 1, wherein said monomer mixture (A) additionally comprises
  e) from 0 to 10% by weight of other copolymerizable monomers (monomers V) selected from the group consisting of an acrylate or methacrylate of $C_{1-8}$ alkanol, methacrylonitrile, an N-(lower)alkylacrylamide or methacrylamide, a vinyl aromatic compound and a mixture thereof.

* * * * *